Feb. 5, 1924.
C. N. BUCHANAN
1,482,380
TONGS
Filed Jan. 3, 1922
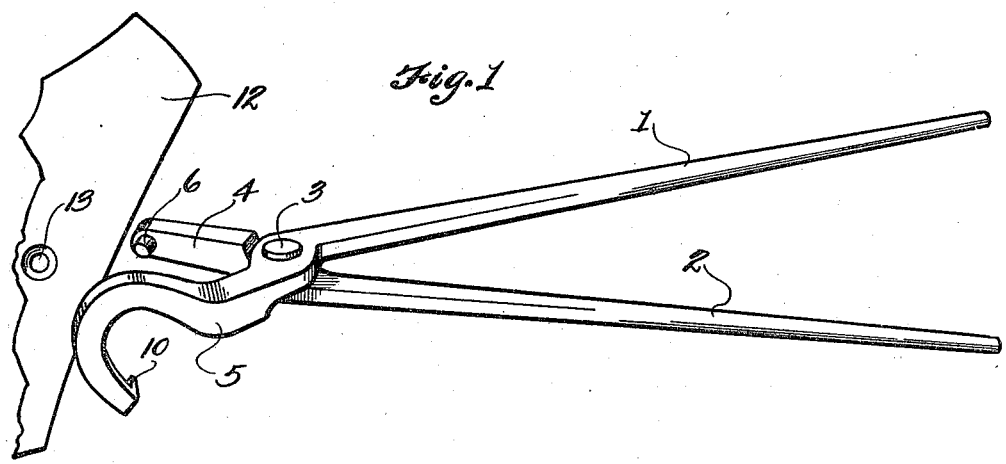
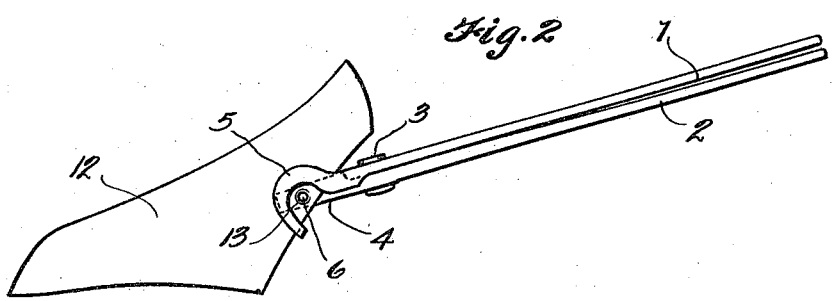
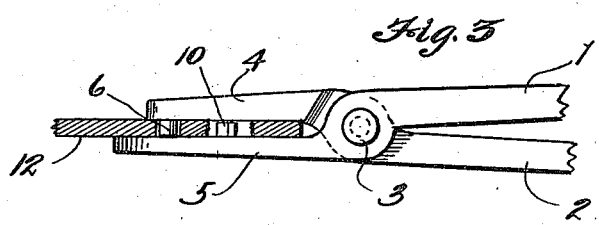
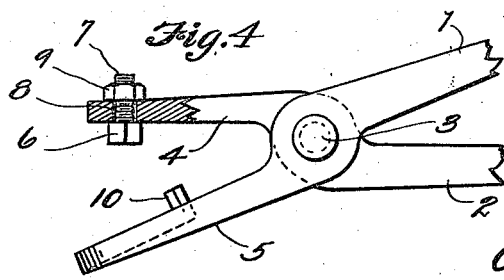
Inventor
CORRINNE N. BUCHANAN
By Attorney
Richard F. Cook Patented Feb. 5, 1924.

1,482,380

UNITED STATES PATENT OFFICE.

CORRINNE N. BUCHANAN, OF EVERSON, WASHINGTON, ASSIGNOR OF ONE-HALF TO L. DANIELS, OF EVERSON, WASHINGTON.

TONGS.

Application filed January 3, 1922. Serial No. 526,818.

*To all whom it may concern:*

Be it known that I, CORRINNE N. BUCHANAN, a citizen of the United States, and a resident of the town of Everson, county of Whatcom, and State of Washington, have invented certain new and useful Improvements in Tongs, of which the following is a specification.

This invention relates to improvements in tongs, and more particularly to a type of tongs adapted to be used by blacksmiths, machinists, or others, for the purpose of handling plow shares, or the like, during the process of sharpening the same.

It is the principal object of the invention to provide a pair of tongs whereby plow shares of a certain type may be held easily and securely, and handled to the best advantage during a sharpening, or grinding, operation.

It is a further object of the invention to provide a pair of tongs for the above purpose, wherein one of the jaws is equipped with an inwardly projecting stud that is adapted, when the tongs are used, to extend within a bolt aperture in the plow share, so that the latter will be prevented from slipping from between the jaws, and the other jaw is of a hook-like character lying both above and below the plane of the other jaw, and, at its end, has a laterally turned stop portion adapted to engage against the edge of the plow share held between the jaws, to cooperate with the stud on the other jaw to hold the share perfectly rigid.

Another object of the invention is to provide removable studs for the jaw, which may be made in different shapes and sizes to fit apertures in the plow shares of different shape and size.

In accomplishing these and other objects of the invention, I have provided the improved details of construction, the preferred forms of which are illustrated in the accompanying drawings, wherein—

Figure 1 is a perspective view of a pair of tongs embodied by the present invention; the tongs being shown in open position preparatory to being applied to a plow share.

Figure 2 is a view illustrating the tongs as applied functionally to a plow share.

Figure 3 is a partial view of the tongs, showing the jaws as applied to a plow share; the latter being shown in section, partly broken away to illustrate the application of the stud to the aperture and the stop engaging the edge of the share.

Figure 4 is a view of the jaws of a pair of tongs, wherein the jaw which carries the stud is shown in section to illustrate the manner in which the stud is mounted.

Referring more in detail to the drawings—

1 and 2 designate paired handles, of a pair of tongs embodied by the present invention, which are pivotally connected, by means of a rivet, or bolt, as shown at 3, so that they may be opened apart or closed together. These handle portions are respectively provided with jaw ends 4 and 5; the jaw 4 being equipped near its end with an inwardly projecting stud 6 which may be round, or square, or any other shape, and may be made in different sizes and, as is illustrated in Figure 4, is equipped with a threaded shank 7 which projects through an opening 8 in the jaw and has a nut 9 threaded thereon to hold it in place. The jaw 5 is of a hook-like character and, when the two jaws are clamped together, it extends upwardly over the stud 6 and then is turned downwardly and rearwardly and, at its end, has a laterally turned stop portion 10.

Plow shares with which tongs of this character are to be used are of the character designated at 12 in Figures 1 and 2. Such shares are provided, near the back edges, with apertures, as shown at 13, for receiving bolts whereby they may be attached to the frame of the plow. These apertures are utilized, when the tongs are applied thereto, for receiving the stud of the jaw 4 and, when the jaws are clamped against opposite sides of the share, as is shown in Figure 3, the jaw 5 pressing against the side of the share opposite to that engaged by the jaw 4, retains the share rigidly clamped, since it can not be removed from the jaws so long as the stud is extended within the aperture. The inturned stop portion of the jaw 5 engages against the edge of the share at a point below the aperture and thus cooperates with the stud and the base of the mouth provided between the jaws, in retaining the share in a rigid grip.

If it is desired, the studs 6 may be made integral with the jaw 4, as is shown in Figure 3, but it is more desirable to have the studs removable in order that those of proper size may be used in apertures of different sizes.

It is apparent that various changes could be made in the construction without departing from the spirit of the invention, and for this reason, I do not wish to be limited entirely to the construction shown.

Having thus described my invention, what I claim as new therein and desire to secure by Letters-Patent, is:

A pair of plow share tongs of the class described, comprising two crossed pivotally joined handles with jaws extending therefrom; one of said jaws being substantially straight, and is adapted, when the tongs are in use, to flatly engage one side of the plow share and having an inwardly projecting stud at its end for extension within an opening in the said plow share; the other of the jaws being adapted to flatly engage the face of the plow share opposite that engaged by the straight jaw, and is of hook form and extends circularly about the opening in the plow share and is provided with an inturned hook at its end for engaging the edge of the share.

Signed at Seattle, Washington, this 28th day of December, 1921.

CORRINNE N. BUCHANAN.